Dec. 16, 1958    C. C. BAUERLEIN ET AL    2,864,536
FLUID METERING DEVICE
Filed Aug. 28, 1956    4 Sheets-Sheet 1
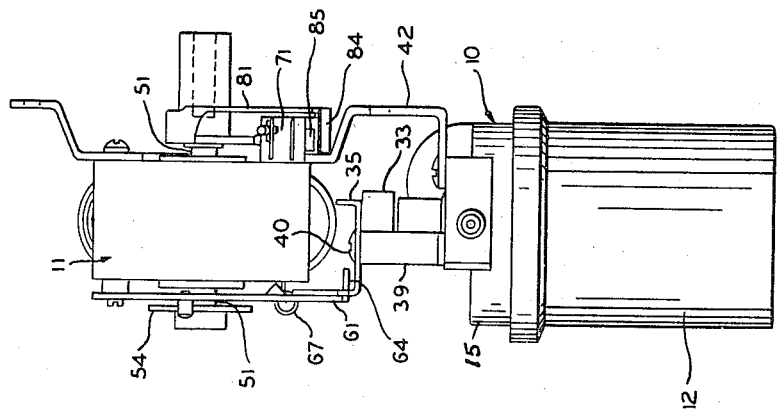
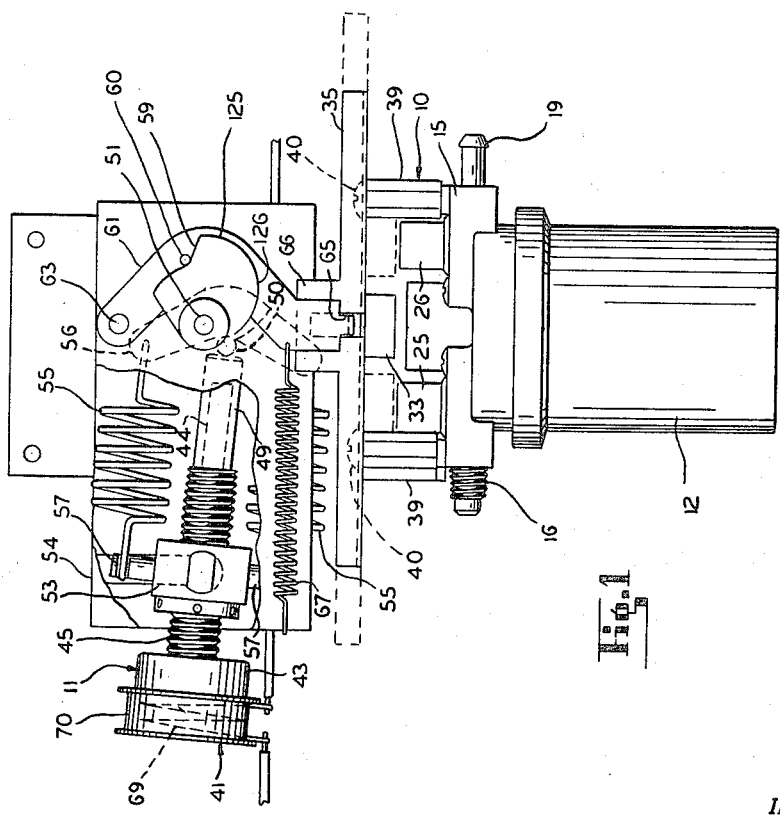
INVENTORS
CARL C. BAUERLEIN
BY JERRY C. JANQUART
ATTORNEYS

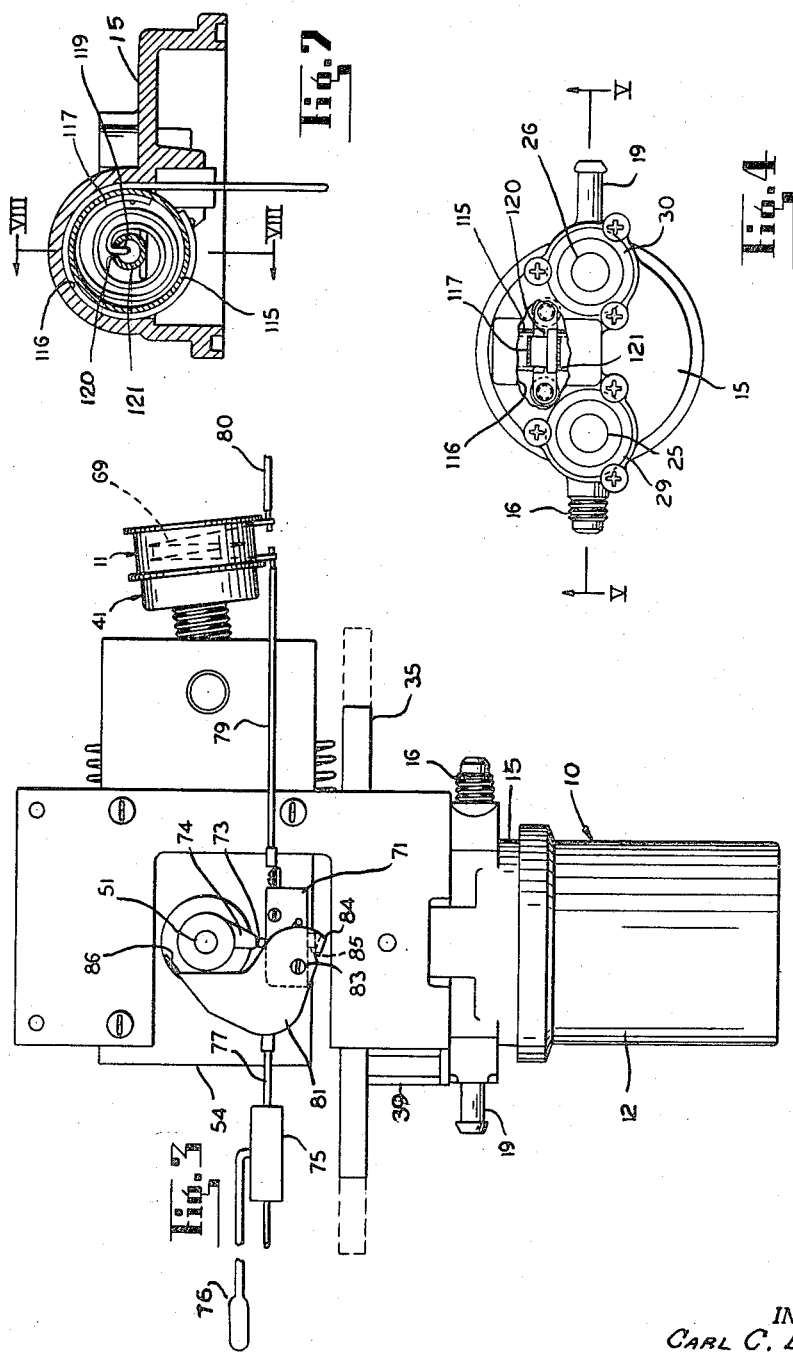

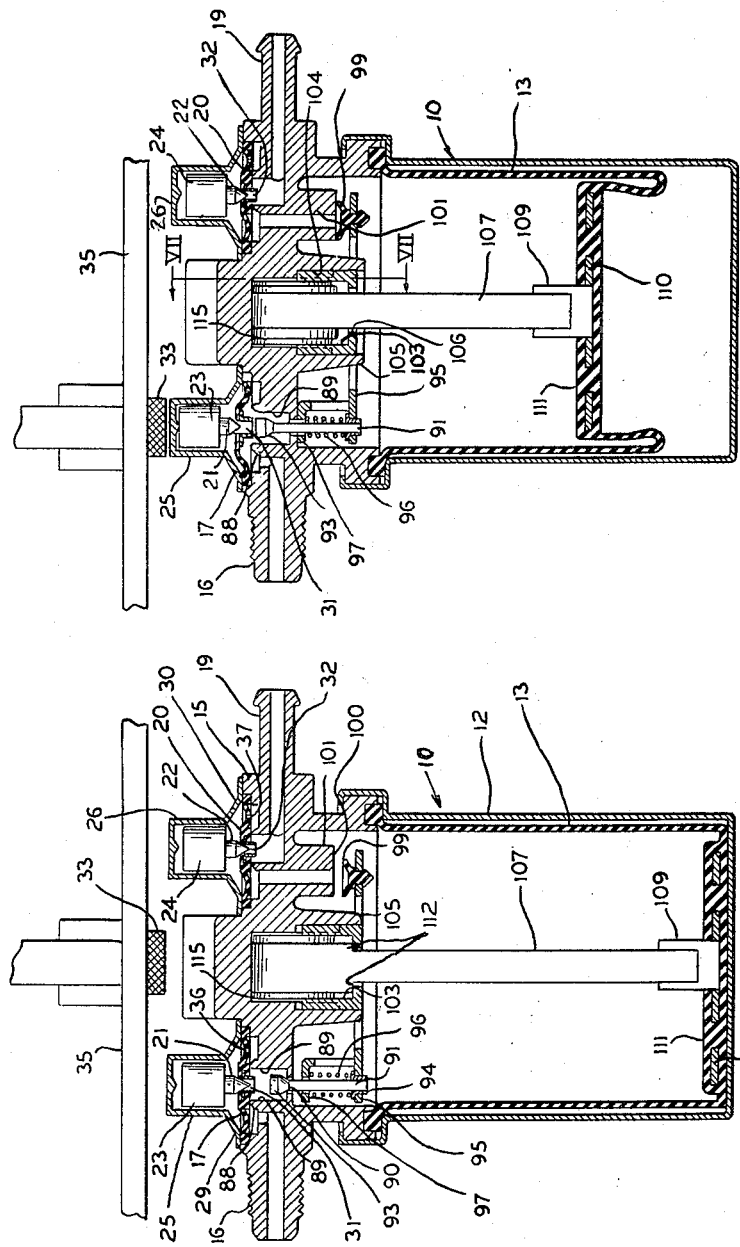

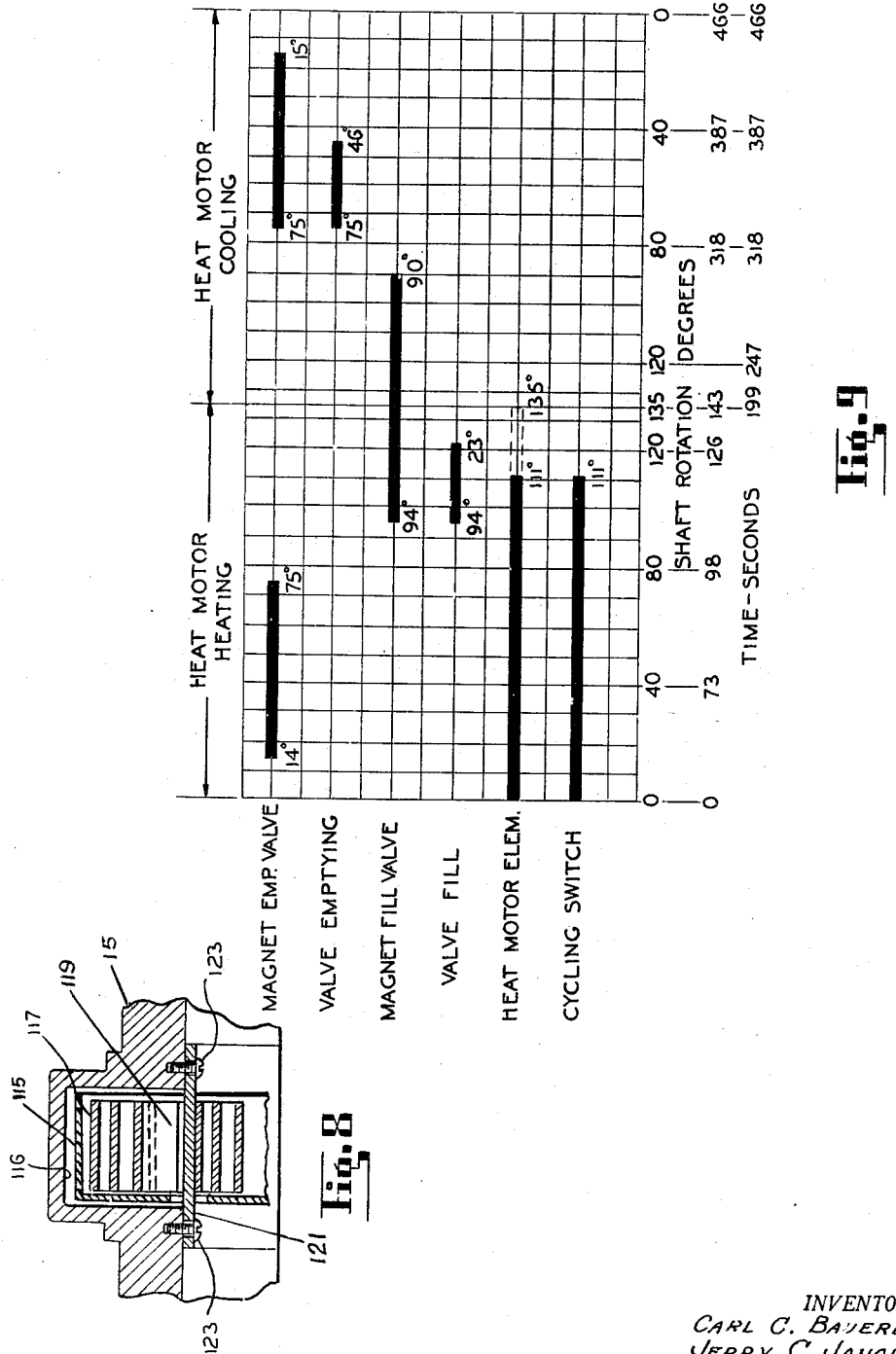

United States Patent Office 2,864,536
Patented Dec. 16, 1958

2,864,536

FLUID METERING DEVICE

Carl C. Bauerlein, Lincolnwood, and Jerry C. Janquart, McHenry, Ill., assignors to The Dole Valve Company, Chicago, Ill., a corporation of Illinois Application August 28, 1956, Serial No. 606,683

13 Claims. (Cl. 222—54)

This invention relates to improvements in liquid metering devices and more particularly relates to such devices as are adapted to automatically fill the trays of automatic ice makers with a uniform volume of water at the termination of the operation of ejecting the cubes from the ice trays.

A principal object of the invention is to provide a new and improved liquid metering device in which the metered liquid is measured by extension of a chamber.

A further object of the invention is to provide a liquid metering device having a chamber extensible by the liquid admitted thereto and having means retracting the chamber to meter liquid therefrom.

A further object of the invention is to provide a simple and improved form of metering device having an extensible and contractible measuring chamber in which the chamber is extended by the fluid admitted thereto and is contracted by the energy of a spring stored up during the extending operation, and in which interlocking valves are provided to prevent the metering of liquid from the chamber except when the chamber is in its fully extended position.

Still another object of the invention is to provide a liquid metering device having a varying volume measuring chamber having individual valves operated under the cyclic control of the device to be filled, for increasing the volume of the chamber by the delivery of water thereto through one valve, having means for decreasing the volume of the chamber and delivering water through the other valve, together with a pair of interlocking valves operated by extensible and retractible movement of the chamber for accommodating the metering of liquid only when the chamber is in its fully extended position and for preventing the admission of liquid into the chamber except when the chamber is in its fully contracted position.

Still another object of the invention is to provide a liquid metering device having inlet and outlet valves cyclically operated by the ejector motor of an ice maker and the like, operable to admit liquid to a measuring chamber and to meter liquid therefrom, together with interlocking valves preventing the filling of the measuring chamber except when entirely empty and preventing the dispensing of liquid from the measuring chamber except when entirely full.

These and other objects of the invention will appear from time to time as the following specification proceeds and with reference to the accompanying drawings wherein:

Figure 1 is a view in side elevation of a liquid metering device constructed in accordance with the invention with certain parts broken away in order to illustrate certain details of the heat motor for controlling operation of the device.

Figure 2 is an end view of the device shown in Figure 1;

Figure 3 is a view in side elevation of the device shown in Figure 1, looking at the opposite side thereof from the side shown in Figure 1;

Figure 4 is a plan view of the measuring chamber with the valve operating means removed and with certain parts of the cover broken away and certain other parts shown in horizontal section;

Figure 5 is a vertical sectional view taken substantially along line V—V of Figure 4;

Figure 6 is a view like Figure 5 but showing the measuring chamber partially filled;

Figure 7 is a vertical sectional view taken substantially along line VII—VII of Figure 6;

Figure 8 is a sectional view somewhat like Figure 7 but with the coil spring for retractibly moving the liner removed; and Figure 9 is a schematic diagram diagrammatically illustrating the cycle of operation of the filling and emptying valves in relation to operation of the heat motor effecting operation of said valves.

In the embodiment of the invention illustrated in the drawings, we have shown a metering or measuring and dispensing device 10 operated by the heat motor 11, which may be operated under the control of a cyclic control for an ice maker (not shown), and which also may operate to supply the power to eject ice cubes from the ice cube tray of an ice maker (not shown).

The metering device 10 is particularly adapted to supply a uniform volume of water to the ice cube tray (not shown) of an ice maker at the termination of the operation of ejecting the ice cubes from the tray and to avoid over or under filling of the tray and includes a container 12 having a liner 13 in the form of a flexible bag conforming to the inner wall of the container when full. The inside of the liner 13 forms a measuring chamber closed by a top cover 15 sealing said liner to the container 12 and having an inlet 16 leading thereinto to fill the measuring chamber under the control of an inlet valve 17. An outlet 19 leads from said cover for supplying a measured volume of water to an ice cube tray (not shown) and the like, under the control of an outlet valve 20.

The valves 17 and 20 are herein shown as being pilot controlled diaphragm valves, respectively controlled by pilots 21 and 22. The pilots 21 and 22 are shown as being formed integrally with and extending downwardly from cylinders or armatures 23 and 24, respectively, made from a magnetizable material and respectively guided in guides 25 and 26. The guides 25 and 26 are shown as being generally cylindrical in form and as extending upwardly from and being formed integrally with end caps 29 and 30 for the diaphragm valves 17 and 20, and maintaining said diaphragm valves in sealing engagement with the cover 15 for the container 12. The end caps 29 and 30 may be made from brass or any other non-magnetizable material.

The pilots 21 and 22 are alternately moved out of engagement with orifices 31 and 32 leading through the thickened central portions of the respective diaphragm valves 17 and 20 upon the envelopment of the armatures 23 or 24 with the magnetic field of a permanent magnet 33. The permanent magnet 33 is herein shown as being a block, rectangular in cross section and secured to and depending from a slide 35, slidably guided for rectilinear movement along the cover 15 in vertically spaced relation with respect to the top thereof. The slide 35 is operative to alternately position the magnet 33 to envelop the armatures 23 or 24 with its magnetic field and to effect movement of either of said pilots along the respective guides 25 or 26 to withdraw either of the pilots 21 and 22 from the orifices 31 or 32 and relieve pressure from the upper sides of the diaphragm valves 17 or 20, to effect opening thereof by pressure acting on the underside thereof as is usual with such valves. The permanent magnet 33 may be made from Alnico, Permalloy or a steel having high remanence and coercive force and containing high percentages of tungsten or cobalt.

The diaphragm valves 17 and 20 are well known forms of pressure operated pilot controlled diaphragm valves and each have bleeder holes 36 and 37, respectively, leading through the web thereof to supply fluid pressure to the top sides of the respective diaphragms and maintain the diaphragm valves closed except upon the release of pressure by the opening of the respective orifices 31 and 32. A detailed description of said valves, therefore, need not be given herein. It should here be understood that while we have shown the diaphragm valves 17 and 20 as being controlled by pilots operated by permanent magnets, that they need not necessarily be operated by permanent magnets but may be operated by electromagnets as well.

The slide 35 is shown as being slidably mounted on spaced posts 39 secured to and extending upwardly from the top of the cover 15. As herein shown, the posts 39 are spaced outwardly from the guides 25 and 26 and have machine screws 40 threaded in the tops thereof and extending through slotted portions (not shown) of the slide 35, to guide said slide to position the permanent magnet 33 over either of the guides 25 or 26. The slide 35 is slidably moved along the posts 39 to position the permanent magnet 33 over either of the guides 25 or 26 and the respective armatures 23 or 24 guided therein by operation of the heat motor 11. The heat motor 11 is herein shown as being of a form like that shown and described in an application Serial No. 552,054, filed by Edward E. Modes et al. on December 9, 1955, now Patent No. 2,838,943, dated June 17, 1958 and entitled "Heat Motor for Producing Rotary Motion," so need not herein be shown or described in detail.

The heat motor 11 is mounted on the top cover 15 on a bracket 42 and includes a power type of thermal element 41 having a casing 43 containing a fusible thermally expansible material for extending a piston 44 from a cylinder 45 as the temperature of the fusible thermally expansible material reaches its fusion point, as shown and described in the Vernet Patent No. 2,368,181 dated January 30, 1945, and no part of the present invention so not herein shown or described further.

The piston 44 extends within a piston extension 49 having engagement with a crank pin 50 for angularly moving said crank pin and turning spaced crank shafts 51 upon extensible movement of the piston 44 with respect to the cylinder 45. The crank shafts 51 are suitably journalled in opposite side walls 54 of the casing for the heat motor. One of said crank shafts may drive the ejector of an ice maker (not shown). The cylinder 45 is shown as being threaded within a spider 53 rockingly carried between the side walls 54. The crank shafts 51 are rotated in a reverse direction and the piston 44 is returned within the cylinder 45, upon reductions in temperature, by two tension springs 55 connected at their inner ends to opposite ends of a yoke 56 having bearing engagement with the crank pin 50. The tension springs 55 are connected at their opposite ends to pins 57 projecting in opposite directions from the spider 53.

A cam 59 is keyed or otherwise secured to one crank shaft 51 and is rotatably driven thereby. The cam 59 has engagement with a follower 60, extending laterally from a pivoted actuator arm 61 for the slide 35. The actuator arm 61 is pivoted on one of the side plates 54 on the outside thereof, on a pivot pin 63 and is shown as depending from said pivot pin beneath the bottom of the side plates 54. The actuator arm 61 has an inwardly extending right angled portion 64 slidably extending through a slot 65 formed in an upright central portion 66 of the slide 35, for rectilinearly moving said slide upon pivotal movement of the actuator arm 61 about the axis of the pivot pin 63. A tension spring 67 is shown as being hooked at one end to the end of a side plate 54 facing the thermal element 41 and at its opposite end to the actuator arm 61 to bias the follower 60 into engagement with the face of the cam 59.

The thermal element 41 is shown as being energized by a resistor heater 69 encircling the casing 43 and contained within an outer shell portion 70 encircling said resistor heater and casing. It should here be understood that the resistor heater may either encircle the outside of the casing 43 or may be contained within said casing, and that if desired the fusible thermally expansible material may act as a resistor.

The resistor heater 69 is shown in Figure 3 as being energized under the control of a cycling switch 71, which may be a microswitch and has a depressible switch button 73 engaged by a cam arm 74 on a crank shaft 51 projecting from the opposite side plate 54 from the side plate 54, on which the actuator lever 61 is mounted.

The switch 71 and resistor heater 69 may be energized through a switch 75 which may be operated by a thermostat 76 sensing the temperature of the frozen ice cubes. The switch 75 is connected with the switch 71 through a conductor 77. The switch 71 is in turn connected with one terminal of the resistor heater 69 by a conductor 79. A conductor 80 is shown as being connected to the other terminal of the resistor heater 69. The conductor 80 may be connected to ground to effect energization of the resistor heater 69 when the switch 75 is closed and the switch 71 is also closed by depression of the push button 73 by the cam 74 (Figure 3). The switch 71 may be a double throw type of microswitch in which the contacts are engaged with each other to complete a circuit upon depression of the push button 73 upon movement of the cam 74 in one direction and in which the contacts remain engaged after the cam 74 has passed by the push button 73. The contacts of the switch are broken by a pivoted operator 81, pivoted to the casing for the switch 71 on a pivot pin 83 and having an arm 84 extending inwardly beneath the switch 71 in position to engage a switch button 85. The operator 81 also has an inclined arm 86 extending inwardly therefrom engaged by the cam 74 at the end of the power stroke of the piston 44 to pivot the operator 81 to depress the push button 85 and break the energizing circuit to the resistor heater 69 and accommodate the thermal element to cool. The tension springs 55 will then move the crank shafts 51 in a return direction and retractibly move the piston 44 with respect to the cylinder 45.

It may be seen from the foregoing that upon the closing of the contacts of the switch 75 as when the ice cubes are frozen, that the resistor heater 69 will be energized to heat the thermal element 41 and effect extensible movement of the piston 44 and operation of the crank shaft 51 to operate the actuator 61 to rectilinearly move the slide 35 along the posts 39 in accordance with the position of the follower 60 on the face of the cam 59. At the end of travel of the piston 44, the cam 73 will trip the operator 81, to effect depression of the push button 85 and cooling of the thermal element 41. The springs 55 will then rotate the crank shaft 51 in an opposite direction.

Referring now in particular to Figures 5 through 8, the valve 17 engages a seat 88 encircling a port 89 leading downwardly through the cover 15 and terminating in a reduced diameter passageway 90 having a stem 91 of an inlet interlocking valve 93 extending therethrough in inwardly spaced relation with respect thereto. The stem 91 is secured to a flanged collar 94 slidably carried in a plate 95, and biased into engagement with said plate by a compression spring 96. The spring 96 encircles the stem 91 and is interposed between the flange of the flanged collar 94 and a guide 97 for the stem 91. The interlocking valve 93 is operated by extensible movement of the liner 13 to block the passage of fluid through the passageway 90 into the chamber formed by the interior of the liner 13, when said chamber is full and the liner is in engagement with the bottom wall of the container 12.

An outlet interlocking valve 99 is mounted at the opposite end of the plate 95 from the interlocking valve 93 for engagement with a face 100 of a boss 101, formed in the bottom of the cover 15, to block the passage of fluid through a passageway 101 extending along said boss and opening to the diaphragm valve 20. The interlocking valve 99 operates to engage the face 100 and block the passage of water to the outlet valve 20 when the interlocking valve 93 is open, and during the operation of filling the measuring chamber formed by the interior of the liner 13, as will now be described.

The plate 95 has a central generally cylindrical portion 103, extending upwardly therefrom and slidably guided within a boss 105 depending from the inside of the cover 15. The plate 95 has a slot 106 extending therethrough within the boundaries of the wall 103, which has a ribbon 107 extending therethrough. The ribbon 107 may be made from metal and is connected at its lower end to a connector 109 connected to and extending upwardly from an apertured plate 110 molded within a bottom 111 of the liner 13. The ribbon 107 has shoulders 112 extending outwardly therefrom and spaced a substantial distance upwardly from the connector 109. The shoulders 112 engage the plate 95 on opposite sides of the slot 106 and move the plate 95 downwardly along the wall 104 of the boss 105 as the liner 13 moves to its fully extended position shown in Figure 5. This will engage the interlocking valve 93 with the passageway 90 and prevent liquid from entering the chamber formed by the interior of the liner 13, when said liner is in its fully extended position shown in Figure 5.

The ribbon 107 serves to retractibly move the liner 13 and is shown in Figure 7 as being riveted or otherwise secured to the periphery of a spool 115, rotatably carried within an upward semi-cylindrical recessed portion 116 of the cover 15. The spool 115 has a coil spring 117, such as a clock spring, riveted or otherwise secured to the inner periphery thereof and coiled within said spool. The spring 117 has an inturned inner end 119 extending within and held by a slot 120 formed in an arbor 121. The arbor 121 extends across the cylindrical recessed portion 116, beyond opposite sides of said recessed portion and is secured to the cover 115 on opposite sides of the spool 115, as by machine screws 123 (Figures 4 and 8).

It may be seen from the foregoing that water or other fluid entering the chamber formed by the interior of the liner 13 through the diaphragm valve 17 and interlocking valve 93 may extend the liner 13 along the interior of the container 12, as said liner is filled. This will wind or store up energy in the spring 117 until the bottom 111 of the liner 13 is in engagement with the bottom of the container 12, as shown in Figure 5. At this time the shoulders 112 of the ribbon 107 will come into engagement with the plate 95 and move said plate downwardly along the boss 105 to engage the valve 93 with the passageway 90 and disengage the valve 99 from the face 100. In this position of the liner 13, no more water may enter the chamber formed by the interior of said liner, even though the valve 17 may be open. The passageway 101 is also open for the discharge of water through the outlet 19 upon opening of the valve 20.

When the valve 20 is opened, as the magnetic field of the permanent magnet 33 envelops the armature 24 and pressure is relieved from the interior of the liner 13, the spring 117 will retractibly move the liner 13 along the interior of the container 12 to discharge water or other fluid through the outlet 19. As the bottom of the liner 13 reaches its upper end of travel, the connector 109 will come into engagement with the bottom of the plate 95 and move said plate upwardly to the position shown in Figure 6. This will engage the valve 99 with the face 100 and prevent the flow of water through the outlet 19. It will also disengage the interlocking valve 93 from the passageway 90 and accommodate the chamber formed by the interior of the liner to be filled upon opening of the diaphragm valve 17.

During filling of the chamber formed by the interior of the liner 13, the plate 95 will remain in its upwardly extended position shown in Figure 6. The interlocking valve 93 will then be open and the valve 99 will be closed. If the permanent magnet 33 should be shifted to open the valve 20 when the liner is partially full, the interlocking valve 99 will prevent the metering of fluid through the outlet 19. Fluid therefore, can only be metered through said outlet after the liner 13 has moved to its full extended position shown in Figure 5 and the shoulders 112 on the ribbon 107 have opened the outlet interlocking valve 99 and closed the inlet interlocking valve 93 by engagement with and downward movement of the plate 95. Also, when the interlocking valve 99 is once opened and the interlocking valve 93 is once closed by downward movement of the plate 95 effected by extension of the liner 13 to its fully extended position, the valve 99 will remain open and the valve 93 will remain closed until the liner 13 has been collapsed or retracted to the position where the connector 109 comes into engagement with plate 95 and moves said plate into its retracted position shown in Figure 6.

Referring now to Figures 1, 2, 3 and 9, and the cyclic operation of the device, upon closing of the switch 75 as by its thermostat sensing the freezing of the ice cubes of an ice maker, the resistor 69 will be energized through the cycling switch 71. The thermal element 41 will then be heated and the piston 44 will be extended from the cylinder 45. This will rotate the shaft 51 and the cam 59 in a direction, which in Figure 1 is shown as being a counterclockwise direction. Rotation of the cam 59 effected by extensible movement of the piston 44 will first move the permanent magnet 33 to the right over the guide 25 and armature 24 until the follower 60 passes by a peak 125 of the cam 59. The pilot 22 will be withdrawn from the orifice 32 and the valve 20 will open. The liner 13, however, will be in its retracted position and the interlocking valve 99 will close the passageway 101. Opening of the valve 20, will, therefore, have no effect.

Upon continued rotation of the cam 59 the spring 67 engaging the follower 60 with a receding face 126 of said cam will move the slide 35 and permanent magnet to the left over the guide 25 and armature 23. The diaphragm inlet valve 17 will then open. At this time the interlocking valve 93 will be open. Fluid will then flow into the chamber formed by the interior of the liner 13 and extensibly move said liner along the container 12 until the shoulders 112 come into engagement with the plate 95 and close the interlocking valve 93 and open the interlocking valve 99. The liner 13 will then be filled with liquid measured by extensible movement of said liner. During the filling operation, the cam 74 will engage the face 86 of the trip lever 81 to effect depression of the push button 85 and deenergization of the resistor heater 69. The crank shaft 51 and cams 59 and 74 will, however, continue to rotate, due to the override effected by continued expansion of the thermally expansible material in the thermal element 41, as indicated by broken lines in Figure 9. The shafts 51 will then reverse their direction of rotation and the springs 55 will return said shaft and the cams 59 and 73 to the position shown in Figure 1. During return movement, the magnet 33 will remain over the guide 25 after the termination of the filling operation determined by closing of the interlocking valve 93, as the liner 13 is full. The slide 35 and magnet 33 will, however, be moved by the follower 60 engaging the face of the cam 59 in a direction toward the guide 26 and armature 24. Continued rotation of the cam 59 in a return direction will bring the magnet 33 over the guide 26 and armature 24, to effect withdrawal of the pilot 22 from the orifice 32 and opening of the valve 20. The valve 99 being open by full extensible movement of the liner 13, opening of the valve 20 will relieve pressure from the interior of said liner and the coil spring 117 will retractably move the bottom of the liner 111 along the interior of the container 12 to meter a measured volume of liquid through the outlet 19 determined by engagement of the connector 109 with the plate 95 and closing of the interlocking valve 99.

It will be understood that various modifications and variations of the present invention may be effected without departing from the spirit and scope of the novel concepts thereof.

We claim as our invention:

1. In a liquid metering device, an expansible and contractible chamber, first valve means operated by contraction of said chamber for admitting liquid thereto to expand said chamber, second valve means for metering liquid from said chamber, spring means for contracting said chamber to meter liquid through said second valve means, and third valve means closed during expansion of said chamber and opened upon full expansion of said chamber to accommodate the metering of fluid through said second valve means and to prevent the metering of fluid through said second valve means, until said chamber has been fully expanded.

2. In a liquid metering device, an expansible and collapsible chamber cyclically controlled valve means for admitting liquid to said chamber to effect expansion thereof, other cyclically controlled valve means for metering liquid from said chamber, means for cyclically alternately operating said valve means a spring connected with said chamber and wound up by expansion of said chamber and contracting said chamber by the energy stored up in said spring by expansion of said chamber upon the opening of said other valve means, and two interlocking valves, one controlling the admission of liquid to said chamber and being closed by full expansion of said chamber and the other controlling the metering of liquid from said chamber through said other valve means and being closed during expansion of said chamber and opened upon full expansion of said chamber.

3. In a liquid metering device, a metering chamber having a movable portion, movable to increase the volume of said chamber to measure a quantity of liquid, first valve means for admitting liquid to said chamber to effect movement of said movable portion to increase the volume thereof, spring means operatively connected with said movable portion for retractibly moving said movable portion to expel liquid therefrom, second valve means controlling the metering of liquid from said chamber, means operable independently of movement of said movable portion for cyclically alternately operating said first and said second valve means, and an interlocking valve associated with said other valve means and closed during filling of said chamber and opened by movement of said movable portion the limit of extensible movement thereof.

4. In a liquid metering device, a metering chamber having a movable portion, movable to increase the volume of said chamber to measure a quantity of liquid, first valve means for admitting liquid to said chamber to effect movement of said movable portion to increase the volume thereof, second valve means for releasing liquid from said chamber, means operable independently of movement of said movable portion for cyclically operating said first and said second valve means, spring means operatively connected with said movable portion for retractibly moving said movable portion to expel liquid from said chamber, and two interlocking valves operable independently of said first valve means and operated by movement of said movable portion when in its extreme extended and retracted positions, one preventing the admission of liquid to said chamber when said movable portion is in its extreme extended position and the other preventing the metering of liquid from said chamber except when said movable portion has been first moved to its extreme extended position.

5. In a liquid metering device, a chamber having a movable portion, a pilot controlled inlet valve for admitting liquid to said chamber, a pilot controlled outlet valve for releasing liquid therefrom, a coil spring mounted within said chamber and having one end fixed from movement with respect to said chamber and an opposite end connected with said movable portion and moved by said movable portion to store up energy in said spring upon extensible movement thereof, and retractibly moving said movable portion to meter a measured volume of liquid from said chamber, and two alternately closing interlocking valves within said chamber, one closing upon full extensible movement of said movable member to block the admission of liquid to said chamber during the metering operation and the other closing upon full retractible movement of said movable portion, to block the discharge of liquid from said chamber upon the filling operation.

6. In a metering device, a chamber having a movable portion, a top cover therefor, an inlet into said cover having communication with said chamber, an outlet from said cover having communication with said chamber, a cyclically operated inlet valve for admitting fluid to said chamber, a cyclically operated release valve for releasing fluid through said outlet, a coil spring mounted within said cover and having one end portion secured to said cover, a spool secured to the opposite end portion of said coil spring, a ribbon connecting said spool with said movable portion, a plate guided on said cover for movement in the direction of movement of said movable portion, two interlocking valves carried by said plate, and spaced engaging means between said ribbon and plate for moving said plate in a direction to open one valve and close the other at one extremity of travel of said movable portion to block the passage of liquid to said chamber and to accommodate the metering of liquid from said chamber, and to operate said interlocking valves in an opposite order at the other extremity of movement of said movable portion, to block the metering of liquid from said chamber and to accommodate the admission of liquid to said chamber.

7. In a liquid metering device, a container, a flexible liner for said container forming a metering chamber and having a bottom portion movable along said container during the filling and metering operations, an inlet leading into said container through the top thereof, an outlet leading from said container through the top thereof, a first valve for admitting fluid from said inlet to said container, a second valve for releasing fluid from said container through said outlet, cyclic operating means for alternately operating said valves, means having operative connection with a bottom portion of said liner for retractibly moving said liner, two alternately operable interlocking valves, one being associated with said inlet and the other being associated with said outlet, and means operated by extensible and retractible movement of said bottom portion for alternately closing one valve and opening the other in the extreme positions of extension and retraction of said movable portion.

8. In a liquid metering device, a container, a flexible liner within said container forming a metering chamber and having a bottom portion movable along said container, a cover for said container, an inlet leading into said container through said cover, an inlet valve controlling the flow of liquid to said container, an outlet from said container leading through the top thereof, an outlet valve controlling the flow of liquid through said outlet, cyclically operated means for alternately opening and closing said valves, means for retractibly moving said liner with respect to said container upon the opening of said outlet valve comprising a coil spring carried by said cover and having one fixed end and an opposite movable end, a ribbon connecting the movable end of said coil spring to said movable bottom portion of said liner and storing up energy in said spring upon extensible movement of said bottom portion, and retractibly moving said bottom portion upon the opening of said outlet valve.

9. In a liquid metering device, a container, a flexible liner within said container forming a metering chamber and having a bottom portion movable along said container, a cover for said container, an inlet leading into said container through said cover, an inlet valve controlling the flow of liquid to said container, an outlet from said container leading through the top thereof, an outlet valve controlling the flow of liquid through said outlet, cyclic operated means for alternately opening and closing said valves, means for retractibly moving said liner with respect to said container upon the opening of said outlet valve comprising a coil spring carried by said cover and having one fixed end and an opposite movable end, a ribbon connecting the movable end of said spring to said movable bottom portion of said liner and storing energy in said spring upon extensible movement of said bottom portion and retractibly moving said bottom portion upon the opening of said outlet valve, a plate carried on said cover for movement toward and from said cover, two interlocking valves carried by said plate, one blocking the flow of liquid to said container through said inlet upon movement of said plate into one position and the other blocking the flow of liquid through said outlet upon movement of said plate to another extreme position, and engaging connections between said ribbon and plate for moving said plate into its two extreme positions upon movement of said movable bottom portion in its extreme extended and retracted positions.

10. In a liquid metering device, a container, a flexible liner for said container having a movable bottom portion, a cover for said container, an inlet to said container through said cover, an outlet from said container through said cover, a pilot controlled pressure operated inlet valve in association with said inlet, a pilot controlled pressure operated outlet valve in association with said outlet, means for cyclically operating said valves comprising a thermal element, electrically energizable means for heating said thermal element, cam means operated by heating and cooling of said thermal element for alternately operating said valves in a predetermined cycle of operation, two interlocking valves, one being associated with said inlet and the other being associated with said outlet, spring means for retractibly moving said bottom portion of said liner to meter liquid through said outlet upon opening of said outlet valve and said associated interlocking valve, and means operated by said spring means for retractibly moving said liner for alternately operating said interlocking valves in the extreme positions of extensible and retractible movement of said liner.

11. In a metering device, a container, a flexible liner for said container having a bottom portion extensibly movable along said container by the supply of liquid thereto, a cover for said container, an inlet leading into said container through said cover, a pilot controlled pressure operated valve in association with said inlet and controlling the flow of liquid from said inlet to said container, an outlet from said container through said cover, a pilot controlled pressure operated valve in association with said outlet and controlling the flow of liquid through said outlet, each of said valves having a magnetizable armature controlling operation thereof, a magnet guided for slidable movement along the top of said cover for alternately operating said valves, a thermal element having an extensible power member, a crank operated by extensible movement of said power member, electrically energizable means for heating said thermal element, cam means operated by said crank controlling the energization and deenergization of said electrically energizable means, other cam means operated by said crank for alternately moving said permanent magnet over said armatures to effect the opening and closing of said valves, a coil spring carried by said cover, a ribbon connecting said coil spring to said movable bottom portion of said liner, said ribbon providing a drive connection from said spring to said liner to retractibly move said liner and meter a measured volume of liquid through said outlet upon opening of said outlet valve, and two interlocking valves operated by movement of said liner to its extreme extended and retracted positions preventing the filling of said container upon movement of said liner to its extreme extended position and preventing the metering of liquid through said outlet except when said liner is in its extreme extended position.

12. In a device for metering liquid, an expansible and contractible chamber, an inlet into said chamber, an outlet from said chamber, a pilot operated inlet diaphragm valve controlling flow through said inlet into said chamber, a pilot operated outlet diaphragm valve controlling flow through said outlet from said chamber, a spring for contracting said chamber upon opening of said outlet valve, and means for cyclically alternately operating said valves to alternately admit liquid to said chamber and effect expansion thereof and to accommodate said spring to contract said chamber and meter a measured volume of liquid therefrom including a thermal element having an extensible power member and electrically energizable heating means for said thermal element.

13. In a device for metering liquid, an expansible and contractible chamber, an inlet into said chamber, means for connecting said inlet to a source of liquid under pressure, an inlet valve operable to admit liquid from said source of liquid under pressure to said chamber to expand said chamber, an outlet from said chamber, an outlet valve operable independently of said inlet valve to effect flow of liquid from said chamber through said outlet, a spring for contracting said chamber to meter liquid from said chamber through said outlet upon operation of said outlet valve, and means for effecting operation of said inlet valve to admit liquid from said source to said chamber, including a thermally responsive element having an extensible power member and electrically energizable heating means operable to effect extension of said power member.

References Cited in the file of this patent
UNITED STATES PATENTS

| | | |
|---|---|---|
| 1,309,724 | Folberth | July 15, 1919 |
| 1,869,953 | Carbonaro | Aug. 2, 1932 |
| 2,028,371 | Wiltse | Jan. 21, 1936 |
| 2,396,527 | Osborne | Mar. 12, 1946 |
| 2,574,700 | Knauss | Nov. 13, 1951 |
| 2,590,275 | Ryder et al. | Mar. 25, 1952 |
| 2,691,358 | Peck | Oct. 12, 1954 |